Dec. 19, 1933.  E. K. LYNN  1,939,907
BRAKE VALVE DEVICE
Filed July 12, 1932
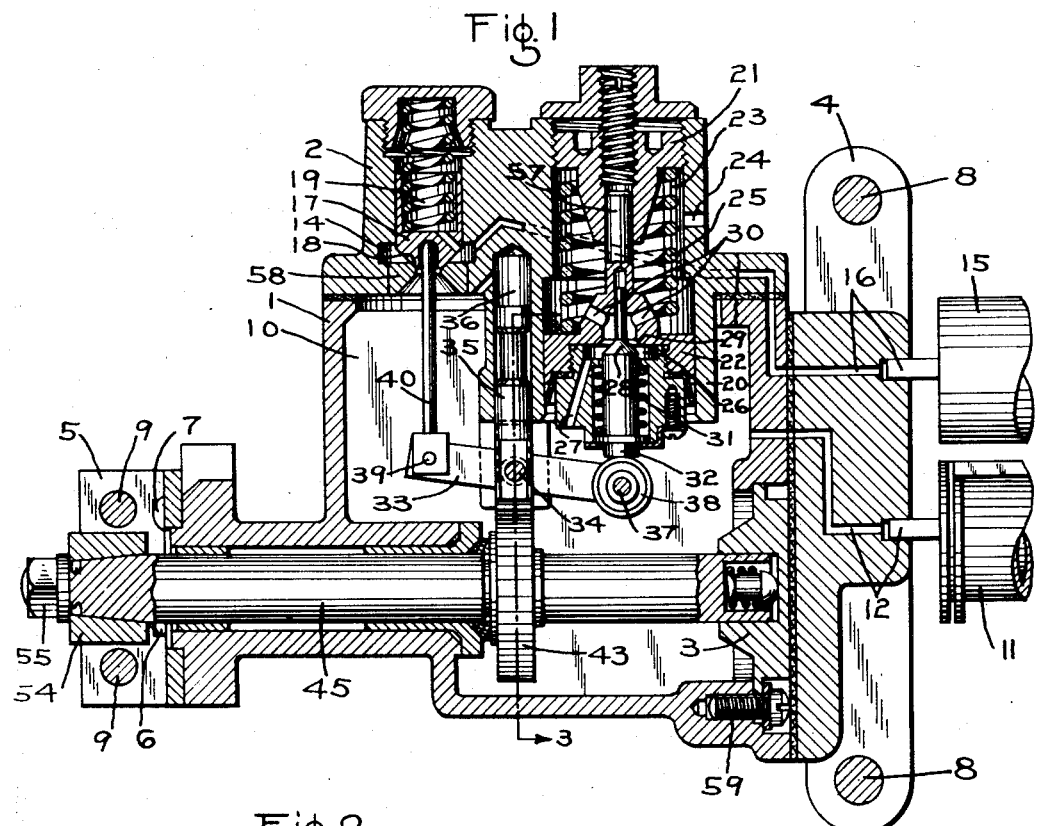
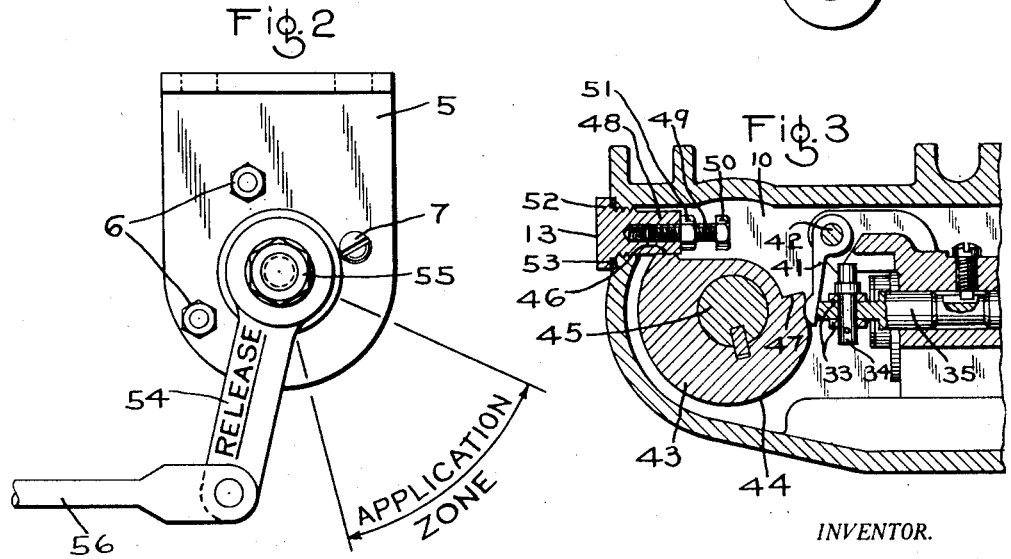
INVENTOR.
EWING K. LYNN
BY Wm. M. Cady
ATTORNEY.

Patented Dec. 19, 1933

1,939,907

UNITED STATES PATENT OFFICE 1,939,907

BRAKE VALVE DEVICE

Ewing K. Lynn, East McKeesport, Pa., assignor to The Westinghouse Air Brake Company, Wilmerding, Pa., a corporation of Pennsylvania Application July 12, 1932. Serial No. 622,022

2 Claims. (Cl. 303—54)

This invention relates to control devices for fluid pressure apparatus and more particularly to brake valve devices of the self-lapping type for use in controlling the operation of fluid pressure brake equipment.

The object of my invention is to provide an improved foot controlled brake valve device of the self-lapping type for controlling the operation of fluid pressure brake equipment.

Other objects and advantages will appear in the following more detailed description of the invention.

In the accompanying drawing; Fig. 1 is a detailed view, mainly in section, of a brake valve device embodying my invention, one form of brake equipment to which the device is applicable being shown diagrammatically; Fig. 2 is a partial end elevational view thereof; and Fig. 3 is a fragmentary sectional view of a portion of the brake valve mechanism as viewed in the direction indicated by the line 3—3 of Fig. 1.

As shown in the drawing, I provide a brake valve device comprising a casing having a main section 1, a side section 2, and a member 3. The section 2 is removably secured to the main casing section 1 by any desired means. The member 3 is also removably secured to the main casing section 1 by any desired means, such as a cap screw 59. The casing section 1 is removably secured at one end to a bracket 4 by any desired means, and at the other end to a bracket 5 by any desired means, such for instance as the bolts 6 and cap screw 7. The brackets 4 and 5 are adapted to be secured to any desired supporting structure by bolts 8 and 9, respectively.

The casing sections 1 and 2 and the member 3, when secured together in the manner just described, define a pressure chamber 10 which may be constantly in communication with the usual brake cylinder 11 through a passage and pipe 12.

The main casing section 1 is substantially the same as is employed in the brake valve device disclosed in the pending application, Serial No. 569,158, of Ewing K. Lynn and Rankin J. Bush, filed March 24, 1932, with the exception that a hole is provided in a wall of said casing for the reception of an adjustable stop 13, which will be described hereinafter.

The casing section 2 and the member 3 are similar to the corresponding section and member of the brake valve device disclosed in the above mentioned application.

The casing section 2 carries a self-lapping mechanism similar to that disclosed in the aforementioned pending application. Briefly, the casing section 2 is provided with a chamber 14 with which the usual main reservoir 15 is in constant communication through a pipe and passage 16. Contained in the chamber and slidably mounted in the casing section 2 is a supply valve 17 which is adapted to seat on a seat 18 provided on a valve seat member 58 carried by the casing section 2, said supply valve being subject on one side to the pressure of a coil spring 19. This valve is operative to control communication from the chamber 14 to the chamber 10.

The casing section 2 is provided with a cylinder 20 which is open at one end to the chamber 10, the other end of the cylinder being closed by a screw-threaded member 21. Operatively mounted in the cylinder, adjacent to its open end, is a movable abutment in the form of a piston 22 having a stem 57. At one side of the piston there is a chamber 23 which is constantly open to the atmosphere through a passage 24. Contained in the chamber 23 is a spring 25 which is interposed between and engages the inner face of the piston 22 and an inner face of the member 21.

Contained in a valve chamber 26 in the piston 22, which is open to the pressure chamber 10 through a passage 27, is an exhaust or release valve 28 which is adapted to seat on a valve seat 29 formed on the piston and which is operative to control communication from the valve chamber 26 to the chamber 23 by way of passages 30 in the piston stem 57. The exhaust valve is subject to the pressure of a light spring 31 tending to unseat said valve. The exhaust valve is provided with a stem 32, the outer end of which is adapted to be operatively engaged by an operating mechanism which will now be briefly described.

For controlling the operation of the supply and exhaust valves 17 and 28, respectively, a mechanism is provided comprising spaced levers 33 which are pivotally connected, intermediate their ends, to a pin 34 mounted in a plunger 35 which at one end is slidably guided by the casing section 2 within the bore 36.

At one side of the pivot pin 34 the ends of the levers 33 are connected together through the medium of a pin 37 and loosely mounted on said pin and disposed between the levers is a roller 38 which is adapted to operatively engage the outer end of the exhaust valve stem 32. At the other side of the pivot pin 34, the ends of the levers are connected together by means of a pin 39 on which one end of an operating rod 40 is pivotally mounted, the opposite end of the rod operatively engaging one side of the supply valve 17.

A member 41, pivotally mounted on a pin 42, secured to the casing, engages the outer end of the plunger 35, as shown in Fig. 3.

For the purpose of controlling the operation of the plunger 35, a rotatable cam 43 is provided having a peripheral cam face 44 adapted to operatively engage the member 41. This cam is secured to an operating shaft which is rotatably mounted in the casing sections 1 and 3. According to one feature of my invention, the peripheral cam surface is provided, at one end, with a shoulder 46 and at the other end with a shoulder 47, for a purpose which will now be disclosed.

For the purpose of confining the rotational movement of the cam 43 to a predetermined zone, a stop is provided which, in the present embodiment, comprises a plug member 13 which extends through an opening in the wall of the main casing section 1 and has screw-threaded connection with said casing section within said hole. The plug member has a stem portion 48 which extends into the pressure chamber 10 in the plane of rotation of the shoulder 46 on the cam and so disposed that said stem portion may be engaged by said shoulder and thus prevent movement of the cam in a clockwise direction beyond release position, as will be hereinafter explained. Screw-threaded into the stem portion 48 of the plug member 13 is an adjusting screw 49 having a head 50 disposed in the plane of rotation of the shoulder 47 on the cam 43 and so disposed that it may be engaged on its inner face by the shoulder 47 on the cam 43 and thus prevent movement of the cam in a counter-clockwise direction beyond full application position, as will be hereinafter explained. The position of the adjusting screw head 50 is fixed when the brake valve device is being assembled, the adjusting screw 49 being locked in position by means of the lock nut 51.

A head 52 is provided on the outer end of the plug member 13, there being a gasket 53 interposed between said head and the main casing section 1.

Secured to the outer end of the operating shaft 45 in any approved manner is a lever 54. According to the construction, the outer end of the shaft 45 is tapered for a portion of its length and this portion engages one end of the lever 54 in a correspondingly tapered hole, the lever and shaft being forced into and maintained in tight engagement by means of a nut 55 which has screw-threaded engagement with the end of the shaft. The free end of the lever 54 is operatively connected to an operating rod 56 which is adapted to be operated by a foot pedal (not shown).

With the operating lever 54 in release position, as shown in Figs. 1 and 2, the cam 43 is also in release position, as shown in Fig. 3, with the shoulder 46 on the cam in engagement with the stem portion 48 of the plug member 13. In this position, the cam will not exert any appreciable pressure on the plunger 35 through the medium of the member 41, so that the pressure of the spring 19 maintains the supply valve 17 seated and the pressure of the spring 31 maintains the exhaust valve 28 unseated.

With the exhaust valve unseated, the brake cylinder 11 is open to the atmosphere through pipe and passage 12, pressure chamber 10 in the brake valve device 1, passage 27 in the piston 22, valve chamber 26, past the unseated valve 28, through passages 30 in the piston stem 57, spring chamber 23 and passage 24.

To effect an application of the brakes, the operating lever 54 is moved in a counter-clockwise direction from release position, causing the shaft 45 and cam 43 to turn in the same direction. As the cam is thus moved, the cam surface 44 engages and forces the member 41 and plunger 35 inwardly. Since, during the initial movement of the lever 54 toward application position, the supply valve 17 and rod 40 remain stationary, due to the pressure of the spring 19 on the supply valve, the pin 39 forms a stationary fulcrum for one end of the levers 33. Now, as the plunger 35 and pin 34 are moved inwardly by the action of the cam 43, the levers 33 are caused to rock about the pin 39 in a counter-clockwise direction and as the levers are thus moved, the roller 38 moving therewith causes the exhaust valve 28 to be seated against the opposing pressure of the spring 31, thus closing the atmospheric communication from the chamber 10 in the brake valve device and consequently from the brake cylinder 11 to the atmosphere. The exhaust valve 28 is seated just before the operating lever 54 reaches the beginning of the application zone.

Since the piston 22 remains stationary, due to the value of the spring 25 being greater than the combined values of the springs 19 and 31, the pin 37 now becomes the fulcrum for the levers 33, so that as the operating lever 54 is moved into the application zone, the ends of the levers carrying the pin 39 will be caused to rock in a clockwise direction and, through the medium of the rod 40, will cause the supply valve 17 to be unseated against the opposing pressure of the spring 19. Fluid under pressure in the valve chamber 14, supplied from the main reservoir through pipe and passage 16 will flow to the brake cylinder through pressure chamber 10 in the brake valve device and passage and pipe 12, thus effecting an application of the brakes.

If it is desired to apply the brakes with a full service application, the operating lever is moved in a counter-clockwise direction until stopped by the engagement of the shoulder 47 on the cam 43 with the inner face of the head 50 of the adjusting screw 49.

Now when the pressure of fluid in pressure chamber 10 acting on one side of the piston 22 is slightly greater than the opposing pressure of the spring 25 acting on the other side of the piston, the piston will move upwardly.

As the piston 22 is thus being moved, the action of the spring 19 causes the supply valve 17 to move toward its seat 18. Through the medium of the rod 40, the action of the valve 17 causes the levers 33 to rock about the pivot pin 34 in a counter-clockwise direction, maintaining the exhaust valve 28 closed. Now when the supply valve 17 seats on the valve seat 18, the further flow of fluid under pressure from the main reservoir to the chamber 10 is closed off and the inward movement of the piston is stopped by the action of the spring 25. Since the piston 22 is brought to a stop at substantially the same time as the supply valve 17 seats, the spring 19, acting through the medium of the rod 40, pin 39, levers 33, pin 37, roller 38 and exhaust valve stem 32 will maintain the exhaust valve 28 seated. Thus, the brake valve device is automatically lapped.

To effect a complete release of the brakes, the operating lever 54 is returned to release position, moving the cam 43 to its release position, the cam being stopped in release position by the engagement of the shoulder 46 on said cam with the stem 48 of the plug member 13. As the cam is being moved to this position, the cam surface 44 tends to gradually recede from the member 41, permitting the spring 31 to act to unseat the exhaust valve 28. The exhaust valve 28, as it is being thus unseated, causes the levers 33 to rock in a clockwise direction about the pin 34, which is maintained stationary by the resistance offered through the medium of the supply valve 17 and the rod 40.

With the exhaust valve 28 thus unseated, fluid under pressure is released from the brake cylinder 11 to the atmosphere through pipe and passage 12, chamber 10 in the brake valve device, passage 27 and exhaust valve chamber 26 in the piston 22, past the unseated exhaust valve 28, through passages 30 in the piston stem 57, spring chamber 23 and passage 24. As the pressure of fluid in chamber 10 reduces, the piston 22 is caused to move outwardly by the action of the spring 25. The unseated exhaust valve now moves forward with the piston, causing the levers 33 to rock in a clockwise direction about the pin 30. Through the medium of the pin 34, this movement of the levers causes the plunger 36 and the member 41 to move longitudinally toward the cam 43, to substantially the position in which it is shown in Fig. 3. Since the supply valve 17 is maintained seated and the exhaust valve 28 unseated, the brake cylinder 11 is open to the atmosphere, consequently the complete release of the brakes is effected.

It will be noted that the brake valve device disclosed in the aforementioned pending application may be readily converted, if desired, into the brake valve device disclosed herein merely by providing a screw-threaded through hole in the wall of the main casing section and a stop member having screw-threaded engagement with said casing section within said hole and by substituting a cam and shaft of the type disclosed herein for the cam and shaft disclosed in the aforementioned application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a controlling valve device for fluid pressure equipment, the combination with valve means for controlling the supply of fluid under pressure to and the release from said equipment, of a casing, a manually operable shaft rotatably mounted in said casing, a cam on said shaft and rotatable therewith for controlling the operation of said valve means, a stop member having screw-threaded engagement with said casing and having a stem portion of extending inwardly of said casing, an adjustable member having screw-threaded engagement with said stem portion, means on said cam adapted to co-operate with said stem portion for limiting movement of the cam in one direction, and means on said cam adapted to co-operate with said adjustable member for limiting movement of the cam in the opposite direction.

2. In a controlling valve device for fluid pressure equipment, the combination with valve means for controlling the supply of fluid under pressure to and the release from said equipment, of a casing, a manually operable shaft rotatably mounted in said casing, a cam on said shaft and rotatable therewith for controlling the operation of said valve means, a stop member having screw-threaded engagement with said casing and having a stem portion extending inwardly of said casing, an adjustable member having screw-threaded engagement with said stem portion, a shoulder on said cam adapted to engage said stem portion for limiting movement of said cam in one direction, and another shoulder on said cam adapted to engage said adjustable member for limiting movement of said cam in the opposite direction.

EWING K. LYNN.